United States Patent
Gunzelmann

(10) Patent No.: US 9,088,328 B2
(45) Date of Patent: Jul. 21, 2015

(54) RECEIVER OF A MOBILE COMMUNICATION DEVICE

(75) Inventor: Bertram Gunzelmann, Koenigsbrunn (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/108,508

(22) Filed: May 16, 2011

(65) Prior Publication Data

US 2012/0295604 A1 Nov. 22, 2012

(51) Int. Cl.
*H04B 1/10* (2006.01)

(52) U.S. Cl.
CPC .................................. *H04B 1/1036* (2013.01)

(58) Field of Classification Search
CPC ............ H04B 1/10–1/14; H04B 1/001; H04B 1/0017; H04B 1/0035; H04B 1/0042; H04B 10/25073; H04B 10/6972; H04B 17/0015; H04B 17/024; H04B 2001/1063
USPC .............. 455/296–312, 226.1–226.4, 69, 522
See application file for complete search history.

(56) References Cited

U.S. PATENT DOCUMENTS

| | | | | |
|---|---|---|---|---|
| 4,539,566 A | * | 9/1985 | Sharpe et al. | 342/389 |
| 5,097,221 A | * | 3/1992 | Miller | 329/318 |
| 5,758,275 A | * | 5/1998 | Cox et al. | 455/307 |
| 5,978,362 A | * | 11/1999 | Lee et al. | 370/315 |
| 6,035,213 A | * | 3/2000 | Tokuda et al. | 455/553.1 |
| 6,115,409 A | * | 9/2000 | Upadhyay et al. | 375/144 |
| 6,718,166 B2 | * | 4/2004 | Cordone et al. | 455/306 |
| 7,242,954 B2 | * | 7/2007 | Lehtinen et al. | 455/522 |
| 2003/0216122 A1 | * | 11/2003 | Cordone et al. | 455/63.1 |
| 2005/0265498 A1 | | 12/2005 | Gunzelmann et al. | |
| 2006/0214825 A1 | | 9/2006 | Kanazashi | |
| 2008/0242256 A1 | | 10/2008 | Gunzelmann et al. | |
| 2009/0164827 A1 | | 6/2009 | Komninakis et al. | |
| 2009/0280766 A1 | * | 11/2009 | Rofougaran et al. | 455/296 |
| 2010/0118921 A1 | * | 5/2010 | Abdelmonem et al. | 375/148 |
| 2010/0197257 A1 | * | 8/2010 | Rajkotia et al. | 455/188.1 |
| 2011/0021170 A1 | * | 1/2011 | Kolze et al. | 455/296 |

FOREIGN PATENT DOCUMENTS

| | | |
|---|---|---|
| EP | 1263161 A1 | 12/2002 |
| EP | 1379003 A2 | 7/2004 |
| FR | 2904899 A1 | 2/2008 |

OTHER PUBLICATIONS

International Search Report dated Aug. 29, 2012 in connection with PCT Application No. PCT/EP2012/059625.
3 GPP 25.141. Section 6.6.2.2 ACLR Requirements. 1 page.
International Search Report dated Dec. 4, 2012 for International Application PCT/EP2012/058891.
International Preliminary Report on Patentability dated Aug. 2, 2013 for International Application No. PCT/EP2012/058891. 8 pages.

* cited by examiner

*Primary Examiner* — Edward Urban
*Assistant Examiner* — Rui Hu
(74) *Attorney, Agent, or Firm* — Eschweiler & Associates, LLC

(57) ABSTRACT

A mobile communication device receiver for receiving a communication signal of a base station via a carrier includes a filter, a scanner and a first controller. The scanner is configured to scan a frequency range in order to determine a spectral distribution of interference within and/or adjacent to the carrier. The first controller is configured to adapt a passband characteristic of the filter based on the spectral distribution.

9 Claims, 7 Drawing Sheets

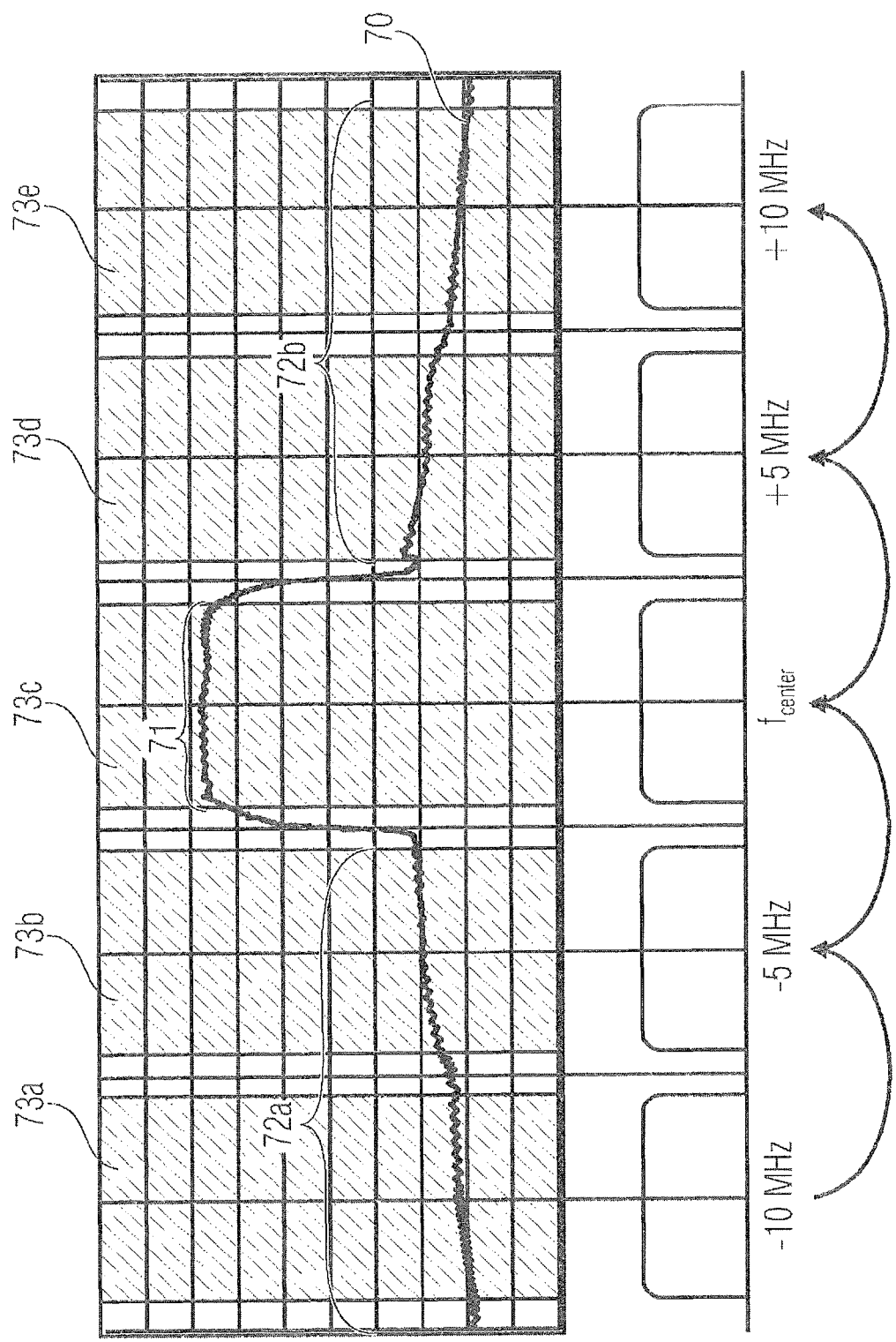

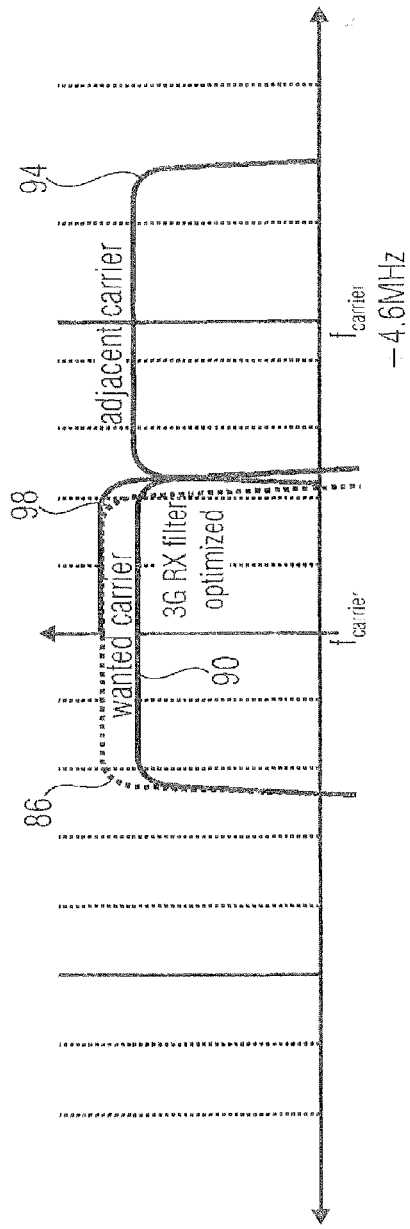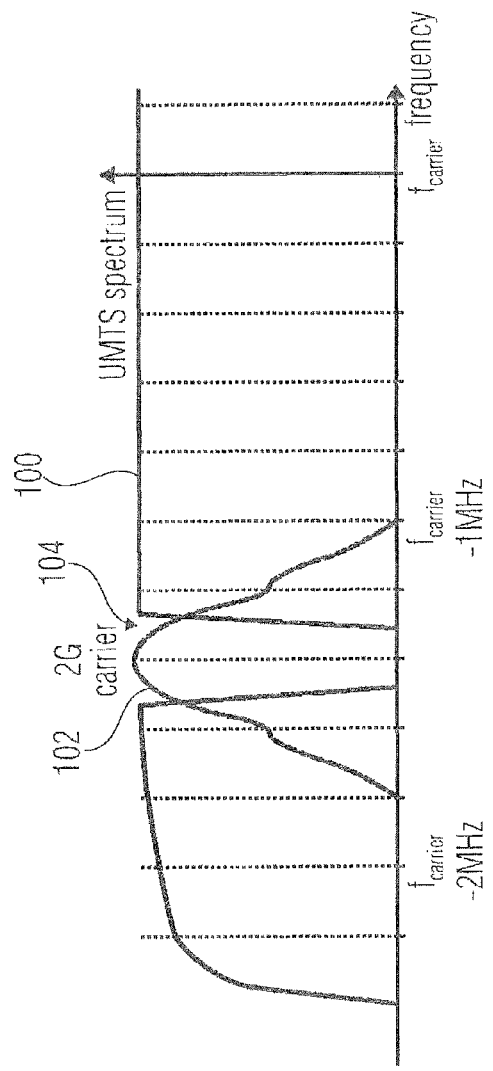

RECEIVER OF A MOBILE COMMUNICATION DEVICE

FIELD

Embodiments according to the invention relate to a receiver of a mobile communication device and a method for operating a receiver of a mobile communication device.

BACKGROUND

A mobile communication device, also referred to as a user equipment (UE), e.g. a mobile phone, comprises a receiver for receiving a communication signal of a base station, such as a 2G-signal, also called a GSM-signal (global system for mobile communication), or a 3G-signal, also called a UMTS-signal (universal mobile telecommunications system). Such communication systems, like a GSM-system or a UMTS-system, use multiple carriers for transmitting information content to multiple receivers, respectively. The receiver of a mobile communication device is configured to receive a communication signal dedicated to the respective mobile communication device via one or more carriers. In order to receive the wanted signal carrier, a filter is used to separate same from, for example, other carriers.

For UMTS-communication-systems, for example, the typical carrier spacing between 3G frequencies is 5 MHz. A guard band between two adjacent carriers is provided. If the guard band between the wanted carrier and an adjacent carrier is set too small, interferences between the wanted carrier and a neighboring carrier may be caused. The result of this interference is a degradation of the signal-to-noise-ratio (SNR) performance.

SUMMARY

Some embodiments according to the invention provide a receiver of a mobile communication device for receiving a communication signal of a base station via a carrier. The receiver comprises a filter and a scanner, which is configured to scan a frequency range in order to determine a spectral distribution of interferences within and/or adjacent to the carrier. The receiver further comprises a first controller for adapting a passband characteristic, such as a range of bandwidth, of the filter on the basis of the spectral distribution.

Further embodiments provide a receiver of a mobile communication device for receiving a communication signal of a base station via a carrier. The receiver comprises a filter and an analyzer, which is configured to analyze metadata, such as system information, signaled by the base station. The receiver further comprises a controller for adapting a passband characteristic, such as a range of bandwidth, of the filter on the basis of the analysis of the metadata.

BRIEF DESCRIPTION OF THE DRAWINGS

Embodiments of the present invention are described in the following with respect to the figures among which

FIG. 3c shows an exemplary power spectral density of a carrier signal and an exemplary carrier spacing;

FIG. 4c schematically shows an interference scenario including two adjacent carriers at reduced carrier spacing compared to the scenario of FIG. 4a and a passband characteristic adjusted one-side only according to an embodiment; and FIG. 4d schematically shows an interference scenario in which a spectrum of a carrier is disturbed by a spectrally a narrow interferer positioned within the broadband spectrum and a passband characteristic optimized by an adjusted notch filter according to an embodiment.

DETAILED DESCRIPTION

Figure 1:
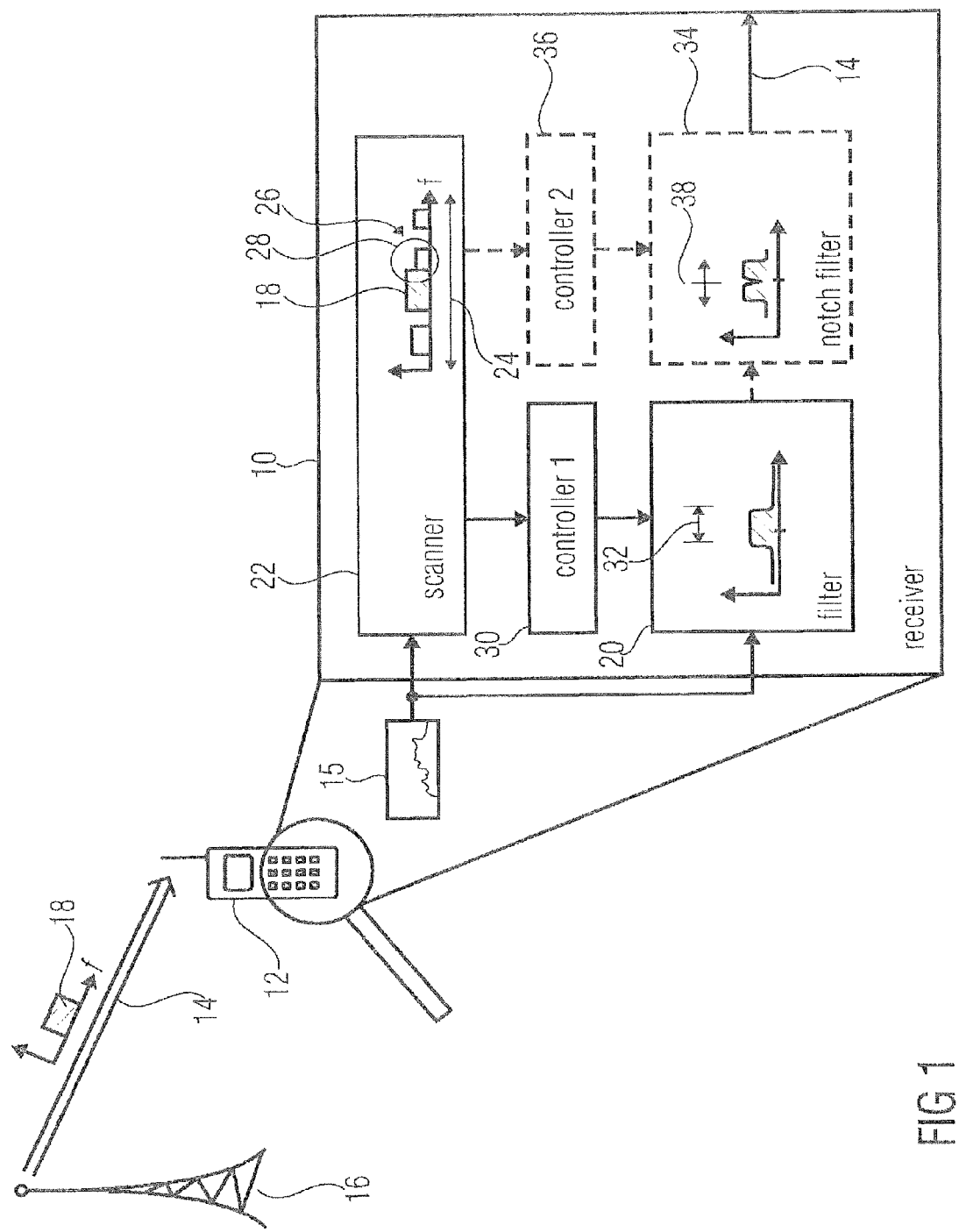
FIG. 1 shows a block diagram of a receiver having a scanner and a filter according to a first embodiment.

Different embodiments of the teachings disclosed herein will subsequently be discussed referring to FIG. 1 to FIG. 4d. In the drawings, identical reference numerals are provided to objects having identical or similar functions so that objects referred to by identical reference numerals within the different embodiments are interchangeable and the description thereof is mutually applicable.

FIG. 1 shows a schematic block diagram of a receiver 10 of a mobile communication device 12, e.g. a mobile phone or a PDA. The receiver 10 is configured to receive a receive signal 15. The receive signal 15 comprises a communication signal 14 dedicated to the mobile communication device 12 and stems from, or is transmitted by, a base station 16 via a carrier 18 within the receive signal 15. The receiver 10 comprises a filter 20 and a scanner 22 which is configured to spectrally scan a frequency range 24 of the communication signal 14. The receiver 10 further comprises a first controller 30 for adapting a passband characteristic, such as a range of bandwidth 32, of the filter 20, wherein the controller 30 is connected between the scanner 22 and the filter 20. In scanning the frequency range 24, the scanner 22 measures a spectral distribution 26 of interferences 28 within and/or adjacent to wanted carrier 18.

The receiver 10 may optionally comprise a second controller 36 and a notch filter 34, which is arranged in series to the filter 20 such that the notch filter 34 is additionally applied to the receive signal 15 on-top of the filter 20. Analogously to the first controller 30, the controller 36 may be connected between the scanner 22 and the notch filter 34. The serial connection of filter 30 and notch filter 34 may be viewed in one embodiment as one filter having the afore-mentioned passband characteristic, i.e. a product of the individual characteristics.

Below, the function of the receiver 10 will be described.

During communication with the base station 16, the mobile communication device 12 gets one or more of a plurality of possible carriers assigned by the base station 16. For example, the base station 16 manages a plurality of possible carriers and distributes or assigns same to several communication devices among which the communication device 12 is. Thus, receiver 10 of the communication device 12 is for receiving the communication signal 14 of the base station via that carrier 18, i.e. the one, or one of those, assigned to it. The carrier 18 assigned to the mobile communication device 12 may change from time to time. Carrier 18 and the remaining carriers of receive signal 15 may be, for example, a 3G signal.

Thus, receiver 10 receives at its antenna or antennas (not shown) a receive signal 15 from the base station 16. The receive signal 15 includes all these carriers, and the filter 20 has a passband characteristic which is set to separate the wanted carrier 18 assigned to the communication device 12 from other carriers. In particular, the carriers may be spaced apart from each other in frequency. In other words, each carrier may be associated with a different frequency. The receiver 10 may have a mixer for downmixing the assigned or wanted carrier 18 to an intermediate or base band signal to which the filter 20 is applied. Alternatively, filter 20 may act on the receive signal 15 as received and amplified at the antenna, directly.

Scanner 22 of receiver 10 scans frequency range 24 of the receive signal 15 in order to determine a spectral distribution 26 of interferences 28 within and/or adjacent to the carrier 18. For example, scanner 22 samples a spectral power distribution within the receive signal 15 thereby discovering, for example, a plurality of used/assigned channels/carriers within frequency band 24 in the spectral vicinity of the wanted carrier 18 or other interferers. For example, scanner 22 may sample the frequency range 24 at a sample pitch of less than ¹⁄₁₀ of a spectral width of carrier 18, such as 200 kHz, in order to identify all used channels and carriers, respectively, which interfere, or possibly could interfere, with the wanted carrier 18. In particular, scanner 22 may measure a signal strength of the receive signal 15 in frequency portions which are narrower, and more closely arranged, when compared to the width of carrier 18, thereby determining an exact interference scenario and the spectral distribution 26 of the interferences 28. In the exemplary illustration of FIG. 1, one exemplary current interference 28 of an adjacent interferer to the carrier 18 is illustrated. However, different types of interferences adjacent to and/or within carrier 18 and different interference scenarios will be shown in detail in FIGS. 4a to 4d. Obviously, frequency band 24 should encompass the currently assigned carrier 18 of the communication device. However, the frequency band 24 may be set depending on the assigned carrier 18 so as to restrict the frequency range to be scanned to the spectral area around and at carrier 18.

On the basis of the spectral distribution 26 the controller 30, which may, for example, comprise a CPU, performs an adaptation of the passband characteristic 32 of the filter 20 in order to reduce the interferences 28 of the wanted carrier.

For example, the passband characteristic 32 of the filter 20 may be adapted such that the passband characteristic 32 or the range of bandwidth is narrowed or cut at one side of the wanted carrier 18. By this measure, a suppression of interferences 28 caused by adjacent carriers is enhanced up to the situation, for example, where the signal degradation caused by a too narrow passband characteristic compared to the spectral carrier width overwhelms the suppression of the influence of interferers caused by neighboring carriers. Due to this, a spacing between the wanted carrier and the adjacent carrier may be made smaller with, nevertheless, yielding the same SNR in receiver 10 as compared to no use of scanner 22 and filter 20, respectively, as will be described in FIGS. 4b and 4c. The control of the passband characteristic may also depend on other control parameters than the spectral distribution 26. For example, controller 30 may be configured to also control a transmit power at which base station transmits the communication signal 14. This control may depend on some measure of the received signal quality of the communication signal 14 such as, for example, the error rate measured in bits by use of some FEC protection within the communication signal. The control may involve the communication device 12 transmitting uplink control data to the base station, requesting more transmit power or permitting the spending of less transmit power. The control of the transmit power may be restricted to some transmit power range. Controller 30 may be configured to take the current position/setting of the transmit power within this range into account. Generally, it should be the aim of controller 30 to keep the necessary transmit power as low as possible. Alternatively, however, controller 30 may control the passband characteristic 32 of the filter 20 independent of the transmit power control. In any case, controller 30 may be configured to change the passband characteristic 32 intermittently in both directions, such as to widen and to narrow—for example, alternatingly—the passband characteristic in order to try out alternative settings as to whether they lead to a better quality of the communication signal such as measured by the error bit rate or the SNR, and to be able to follow temporal changes of the receive situation. In intermittently trying out alternative settings, controller 30 may use the knowledge about the spectral interferer distribution 26 in order to select among different variation possibilities such as widening the current passband characteristic 32 at both sides—higher and lower frequency side—widening or narrowing at one or the other of these sides, and displacing the mid of the passband characteristic. The use of the knowledge in selecting among the variation possibilities may decrease the optimization cycle.

Figure 3A:
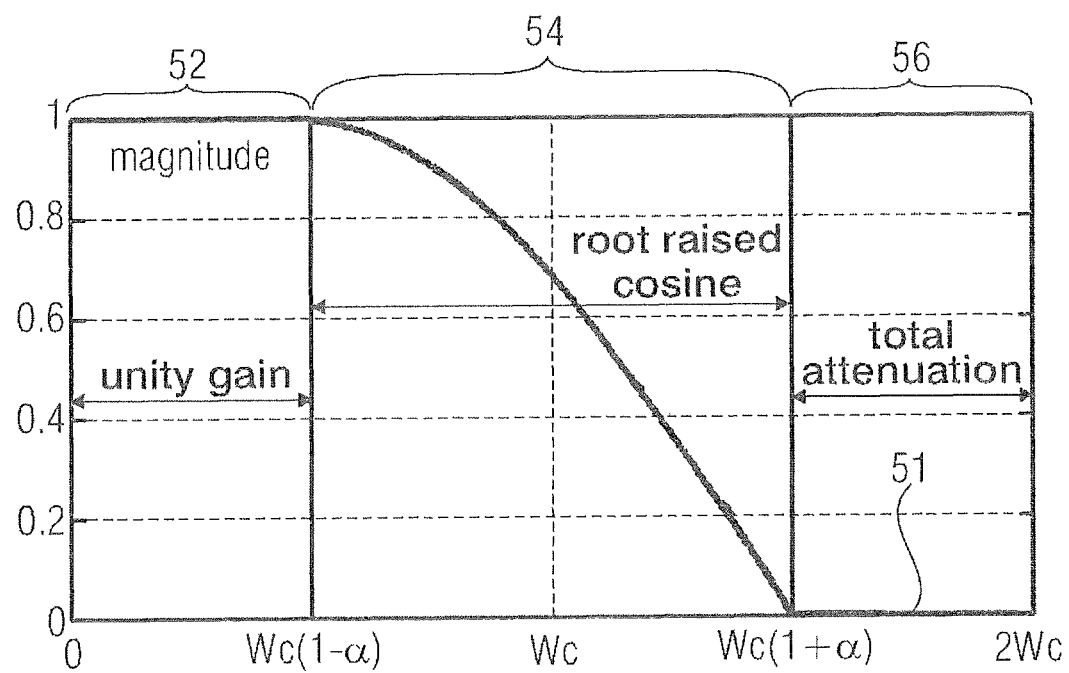
FIG. 3a schematically shows an example for an ideal passband characteristic of a filter according to an embodiment.

In one embodiment filter 20 may be an adjustable passband filter such as, for example, a root-raised-cosine-filter or a filter which may correspond to a raised-cosine (RC) filter characteristic, as described in FIG. 3a. The implementation of the filter 20 can be made out of a combination of analog and digital filtering stages or it could be determined by pure analog or digital filters, respectively.

The communication signal 14 filtered by the filter 20 may additionally be filtered by an optional notch filter 34. Therefore, the optional second controller 36 may be configured to adapt the frequency 38 of the notch filter 34 on the basis of the spectral distribution 26 of interferences 28. The optional notch filter 34 may be applied for the purpose of notching-out an spectrally narrow interference 28 lying within the broadband carrier 18, for example within a 3G spectrum. Such an interferer 18 may be caused by, for example, a 2G carrier, as described in FIG. 4d.

The scanner 22 may be configured to scan the frequency range 24 by using a received signal strength indication (RSSI), which measures the power level being received by the receiver 10 with a unitless range, for example, between 0 to 255. If, for example, the mobile communication device 12 is a 3G device with 2G capabilities, a narrow band RSSI scan with a bandwidth, such as, for example 200 kHz, may be available to the 2G-receiver. This provides for a good estimate of the relevant frequency range 24 at and in the vicinity of carrier 18. Most of the mobile phones and mobile communication devices 12, respectively, have a 2G and a 3G capability, so the 2G-receiver capabilities of the receiver 20 could be reused. Therefore, the scanning of the frequency range 24 of the receive signal 15 may be performed by a 2G-receiver (GSM), which may be comprised by the mobile communication device 12. The receiver 10, in turn, may be 3G-receiver (UMTS).

Alternatively, the arrangement of the filter 20 and the optional notch filter 34 may vary such that the receive signal 15 may be filtered by the notch filter 34 before being filtered by the filter 20.

In summary, the adaptable filter 20 operates reduce interferences 28 adjacent to the wanted carrier 18, and the adaptable optional notch filter 29 operates to reduce interferences 28 within the wanted carrier 18; these different optimization measures and especially the respective passband characteristics for the respective optimization measures will be described in FIGS. 4a to 4d in more detail.

Figure 2:
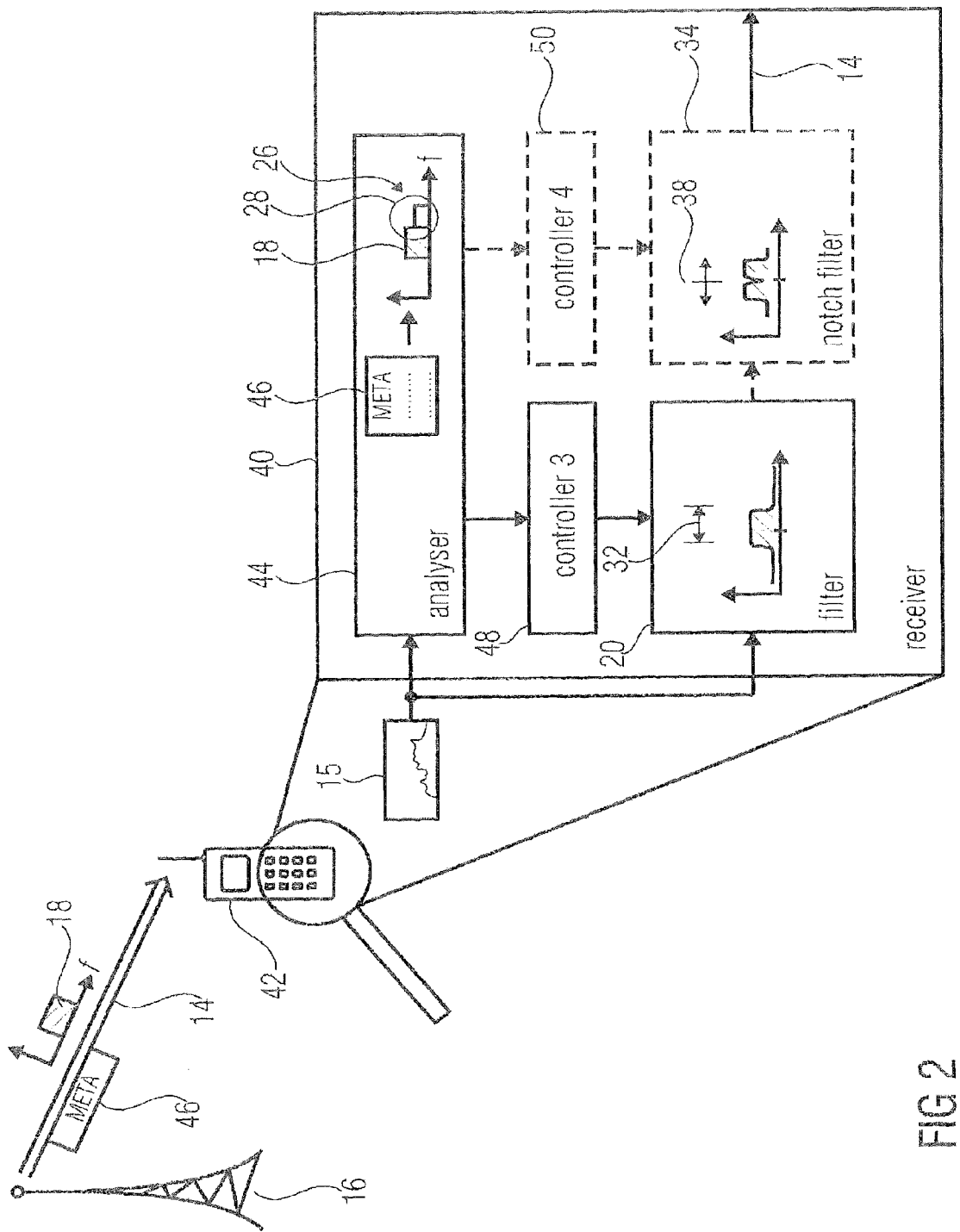
FIG. 2 shows a block diagram of a receiver having an analyzer and a filter according to a second embodiment.

FIG. 2 shows a schematic block diagram of a receiver 40, of a mobile communication device 42, e.g. a mobile phone or smart phone. The receiver 40 is configured to receive the receive signal 15 from the base station 16. The receive signal comprises the communication signal 14 dedicated to the communication device 42 via the carrier 18 within the receive signal 15. The receiver 40 comprises, analogously to the embodiment of FIG. 1, a filter 20. However, differing from the embodiment of FIG. 1, receiver 40 further comprises an analyzer 44 and a third controller 48. The analyzer 44 is configured to analyze metadata 46, also referred to as system information, which are signaled by the base station 16, while the third controller 48 is configured to adapt the passband characteristic 32 of the filter 20 on the basis of the analyzed metadata 46. The third controller 48 is connected between the filter 20 and the analyzer 44.

The receiver 40 may additionally comprise a further optional controller 50 for the optional notch filter 34. The controller 50 connected between the notch filter 34 and the analyzer 44 is configured to adapt the frequency 38 of the notch filter 34. In other words, the structure of the receiver 40 largely complies with the structure of the receiver 10 shown in FIG. 1. The serial connection of filter 30 and notch filter 34 may be viewed as one filter having the afore-mentioned passband characteristic, i.e. a product of the individual characteristics.

Below, the functionality of the receiver 40 will be described.

As has been described with respect to FIG. 1, base station 16 assigns one or more of a plurality of possible carriers to a plurality of mobile communication devices within a reach or cell of base station 16. The mobile communication device 12 may, thus, be one of the plurality mobile communication devices residing in the reach or cell of the communication network and may have a carrier 18 assigned thereto. The base station, in turn, may be part of a larger communication network further comprising, for example, base stations of other, such as locally neighboring or even overlapping cells, and cable-based connections inter-connecting the base stations in order to allow them to exchange control information as will also be described below.

To manage the plurality of communication devices, the communication-network monitors some information such as, for example, on individual base stations of the communication network such as their neighboring relationship, position or the like, or on other communication networks such as a 2G network if the communication network to which base station 16 belongs is a 3G network, on an amount of users within the individual cells and on the used carriers of the individual base stations. One or several of these information pieces are also transmitted from the base station to the receiver 12, respectively, as part of the metadata 46. Such information is signaled by the base station 16 to the communication device 12 via metadata 46 in the communication signal 14. For example, for assigning the communication device 12 to one of the possible carriers, for example, base station 16 may indicate this assignment to the communication device 12 via the metadata 46. The metadata 46 may, thus, be equal for all communication devices within the base station's cell and broadcasted by the base station 16. The base station 16 may, for example, send the metadata 46 and system information, respectively, via a broadcast channel. Alternatively, metadata 46 may be tailored to the needs of the respective communication device.

The analyzer 44, which may be, for example, a CPU or a computer program executable on a CPU, is configured to analyze the metadata 46 in order to determine a spectral distribution 26 of interferences 28 within and/or adjacent to the carrier 18. On the basis of the metadata 46 signaled by the base station 16 and received by the receiver 40, the used carriers and thus, the carrier spacing can be found out very easily by the analyzer 44. This information on the used carriers and/or the carrier spacing enables an estimation of the interferences 28 caused by adjacent carriers or by other carriers, for example, a 2G carrier, laying within the wanted broadband carrier 18. In other words, noise or interference estimation approaches could be used to determine the prevalent interference situation.

The metadata 46 may comprise a first list of UTRA absolute radio-frequency channels (UARFC) for the UMTS-system and/or a second list of absolute radio-frequency channels (ARFC) for the GSM-system. Serving cell UTRA absolute radio-frequency channel number (UARFCN) and cells to be monitored with corresponding UARFCNs are signaled by the base station 16 of the communication network via the metadata 46. Therefore, the analyzer 44 may optionally be configured to analyze the first list of UARFCs in order to find out the carrier spacing, for example, by simple mathematical calculations or by a look-up-table. In addition, information about existence of 2G cells in a specific band may also be available, as the 2G cells also have to be monitored and thus the ARFCs of 2G cells may be signaled by the base station 16 of the communication network via the metadata 46. Therefore, the analyzer 44 may—additionally or alternatively—be configured to analyze a second list of ARFC in order to detect further interfering carriers, e.g. 2G carriers. Now depending on the band specific frequency layout the interference level to the serving cell and to the wanted carrier 18, respectively, can be determined by the analysis of the metadata 46 comprising information on UARFCs and ARFCs. Such an embodiment enables the detection or estimation of a prevalent interference scenario by an analysis of UARFCNs and ARFCNs signaled by the base station 16 of the communication network.

On the basis of the metadata 46 or system information analyzed by the analyzer 44 and, thus, on the basis of the estimated interference scenario, controller 48, which may be, for example, a CPU or a computer program, may perform the adaptation of the passband characteristic 32 of the filter 20 in order to reduce interferences as described above. In other words, the interferer knowledge will allow designing a specific passband characteristic and a specific receiver frequency responses, respectively, which deviate from a RRC-filter design. Thus, controller 48 may just set the passband characteristic 32 of the filter 20 according to the metadata 46 such as, for example, by using the metadata 46 as an index into a look-up table comprising various passband characteristic settings for different metadata 46. Further, controller 48 may use the metadata 46 merely in order to steer a feedback loop for the passband characteristic setting. For example, controller 48 may implement a part of a transmit power feedback-loop along with the base station as has been described above. Additionally or instead, controller 48 may intermittently try another passband characteristic to test as to whether a measure measuring the quality of the received communication signal gets better or not. In order to minimize the test efforts or the test frequency, controller 48 may evaluate the metadata 46. If, for example, the carrier at the lower frequency side of carrier 18 is occupied while the other gets un-used, it is more probable that a widening or even displacement of the passband characteristic 32 at, or to, lower frequencies yields a signal quality increase, than varying the passband characteristic 32 into the other direction.

This may increase the speed in finding the optimum setting. The latter possibility also represents a possibility of combining the embodiment of FIG. 2 with the one of FIG. 1.

Analogously the optional controller 50 for the optional notch filter 34 may adapt the frequency 38 of the notch filter 34.

With regard to the remaining functionality, the receiver 40 complies with the receiver 10. In summary, the difference between the receiver 10 and the receiver 40 is that the determination of the spectral distribution 26 of interferences within and/or adjacent to the carrier 18 may be performed, on the one hand, by the scanner 22 of the receiver 10 and, on the other hand, by the analyzer 44 of the receiver 40.

Alternatively, a combination of the scanner 22 and the analyzer 44 for determining the spectral distribution 26 of the interferences 28 may be applicable. Such an embodiment of a receiver would comprise a scanner 22 and an analyzer 44. Further, the receiver would comprise a first controller 30 and a third controller 48 for adapting a passband characteristic 32 of the filter 20 on the basis of the spectral distribution 26 and on the basis of the analyzed metadata 46. Such a receiver may further comprise the additional controllers 36 and 50 for adapting the frequency 38 of the notch filter 34 on the basis of the spectral distribution 26 and the analyzed metadata 46. The scanner 22 and the analyzer 44 of such a receiver may be connected in order to determine an enhanced interference scenario.

FIG. 3a illustrates a possible implementation of the filter 20 according to one embodiment, namely as an RC filter. FIG. 3a shows a schematic ideal passband characteristic of a filter 20 as a function of a frequency width and a level of attenuation. A graph 51 of the passband characteristic is designed to be the one of an RC-filter, wherein three different ranges of the passband characteristic exist. They are illustrated by graph 51. A first portion 52 of the passband characteristic is unity gain between a zero point of the frequency scale, positioned at a center frequency of the carrier 18, and a frequency Wc(1−α), wherein the passband characteristic has substantially no attenuation in this first portion. The graph 51 of the passband characteristic decreases within second portion 54, between the frequency Wc(1−α), thus defining the frequency width of the filter—and a frequency Wc(1+α), from no attenuation to maximum attenuation as a function of a root raised cosine. The third portion 56 of maximum attenuation of a passband characteristic extends from a frequency Wc(1+α) (to a frequency 2Wc).

The graph 51 of a passband characteristic may, for example, illustrate a passband characteristic, also designated as amplitude response, of a 3GPP W-CDMA root-raised-cosine-channel-filter having an α=0.22. Ideally the root-raised-cosine-filter would suppress the out-of-band-signal above the frequency Wc(1+α)=2.3424 MHz with the frequency Wc being half of 3.84 MHz chip rate. Such a root-raised-cosine-filter (RRC-filter) is used to separate the wanted carrier 18 of a communication signal 14 from a reminder of the receive signal 15, or in other words, to separate the carrier 18 from other carriers received by the receiver 10 or 40 via the antenna. Therefore, a communication system, for example a UMTS system, specifies the transmit signal (TX), which is signaled by the base station 16, by defining a root-raised-cosine spectral shaping of the transmit signal.

The root-raised-cosine-filter corresponds to the root of a raised-cosine-filter and serves the purpose to distribute the characteristic equally between the transmitter (TX) and the base station 16, respectively, transmitting a communication signal 14 and the receiver 10 or 40 (RX) receiving the communication signal 14 via the carrier 18. With the root-raised-cosine filter also in the receiver 10 or 40 (RX) a so-called matched filter is implemented which maximizes signal-to-noise ratio in the receiver 10 or 40 (RX). A particular feature of the RRC-filter is that intersymbolic interference (ISI) may be generated when applied standalone. This means that a single transmitter (TX) impulse will contribute to precursors and post-cursors. Only the combination of a transmitter (TX) and a receiver (RX) root-raised-cosine-filtered will result in a RRC-filer response which allows intersymbolic interference-free transmission. This holds true if the receiver 10 or 40 (RX) samples the signal with a chip rate frequency, for example 3.84 HMZ, on the maximum of the impulse response.

Briefly referring to FIGS. 1 and 2 again, filters 20 and 34 may be the subject of the afore-mentioned filter variation. The direction of variation may be controlled depending on the spectral distribution 26 and the metadata 46, respectively.

Figure 3B:
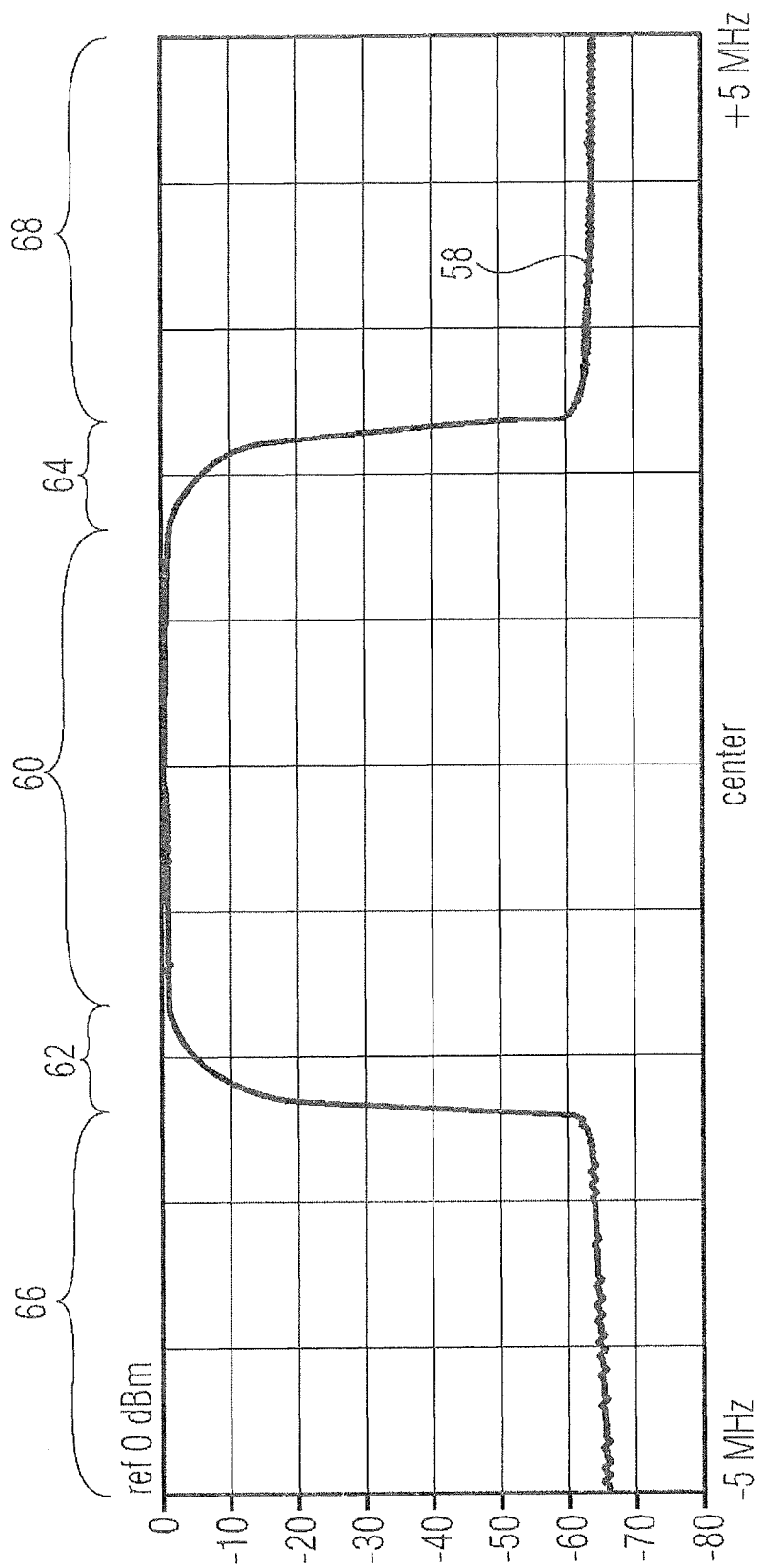
FIG. 3b shows a measured passband characteristic of a possible filter implementation according to an embodiment.

FIG. 3b shows an exemplary measured passband characteristic 58 as a function of a unitless frequency and of the attenuation of the received signal. The diagram of FIG. 3b shows a symmetric graph 58, of the passband characteristic, which complies approximately with a raised cosine assumption. The Graph 58 illustrates five ranges of attenuation, in a relative range to the center of the carrier (0 MHz) plotted over the frequency from −5 MHz to +5 MHz. A first range 60 of graph 58 represents the unity gain without attenuation so that the attenuation level is, for example, around 0 dBm at the center of a carrier. The range 60 extends from a first frequency, approximately −1.8 MHz, to a second frequency, approximately +1.8 MHz. Below the first frequency and above the second frequency the passband characteristic 58 has a second range 62 and third range 64, respectively, in which the signal is attenuated as a function of the root-raised-cosine by the root-raised-cosine filter, for example, the filter 20. The attenuation level of the passband characteristic within the ranges 62 and 64 increases approximately from approximately 0 dBm (at the first and second frequency +/−1.8 MHz) to −62 dBm (at a third and forth frequency +/−2.3424 MHz). Besides the second range 62 a fourth range 66 the graph 58 lies below a third frequency, approximately −2.3424 MHz, while besides the third range 64 the graph 58 a fifth range 68 lies above a fourth frequency, approximately Wc(1+α) equal to 2.3424 MHz. However, due to imperfections like fixed word length implementations and non-idealities in the analog domain there is a limited attenuation in the range 66 below −2.3424 MHz and the range 68 above +2.3424 MHz. In the two ranges 66 and 68 the attenuation level of the passband characteristic 58 is approximately −62 dBm and −65 dBm.

Such a passband characteristic 58 resulting in an overall receiver passband characteristic, which is close to a root-raised-cosine (RRC) passband characteristic, is, for example, provided to the filter 20 of the receiver 10 or 40 to receive the communication signal 14 from the receive signal 15, or, in other words, to separate the wanted carrier 18 from other carriers. Such a root-raised-cosine-filter has a fixed passband characteristic 58, so it is, in contrast to the passband characteristic 32 of the filter 20, not adjustable. That means that the range 52, the range 54 and the range 56 of the passband characteristic 58 is not shiftable within the frequency spectrum (cf. the frequency ranges 60, 62, 64, 66 and 68) and filter does not allow optimization for different interference scenarios or different carrier frequency planning.

FIG. 3c shows a comparison of a power spectral density of a communication signal 14, for example a 3GPP W-CDMA signal, and a typical carrier spacing 73 (frequency planning).

The diagram shows a symmetric graph 70 of the power spectral density as a function of the adjacent-channel-leakage ratio (ACLR), which is plotted over a relative frequency in a range from −10 MHz to +10 MHz, wherein the center of the graph 70 has the center frequency $f_{center}=0$ MHz. Around the frequency $f_{center}$ the graph 70 of the power spectral density has a range 71 from approximately −2.34 MHz to +2.34 MHz with a maximum power spectral density. Outside this range 71 (on a first below −2.34 MHz and on a second side above +2.34 MHz) the graph 70 has two side slopes 72a and 72b, where the power density is significantly decreased.

This diagram further shows the typical carrier spacing 73 including five carriers 73a, 73b, 73c, 73d, and 73e. The wanted carrier 73c is $f_{center}=0$ MHz wherein the UARFCN carrier spacing between the singular 3G frequencies is 5 MHz. Between the respective carriers 73a, 73b, 73c, 73d, and 73e a guard band is provided. As a consequence of that, the two adjacent carrier 73a and 73b (on the first side) are $f_{center}$−10 MHz and $f_{center}$−5 MHz, respectively, and the two adjacent carriers 73d an 73e (on the second side) are $f_{center}$+5 MHz and $f_{center}$+10 MHz, respectively. The two adjacent carriers 73b and 73d with a user equipment channel of +/−5 MHz show an adjacent-channel-leakage ratio limit of the power spectral density at −33 dBc and the two other adjacent carriers 73a and 73d with a user equipment channel +/−10 MHz have an adjacent-channel-leakage ratio limit of the power spectral density at −43 dBc. These ACLR limits correspond to the requirements of the adjacent-channel-leakage ratio for Node B specified by 3GPP.

The diagram shows a frequency planning of an operator, wherein there is enough guard band between two adjacent carriers 73a and 73b, 73b and 73c, 73c and 73d as well as 73d and 73e in order to limit the adjacent channel interferences. So even in case of a carrier spacing 5 MHz there will be adjacent carrier leakage from the transmitter carrier spectrum. The interference from a 3G cell with the carrier UARFCN$_L$ ($f_{center}$−5 MHz) is interfering to the wanted 3G cell with the UARFCN(f); similarly, a 3G cell with a carrier UARFCN$_R$ ($f_{center}$+5 MHz) is interfering to the UARFCN ($f_{center}$). In the same way also further UARFCNs ($f_{center}$+/−*5 MHz) with x=2, 3, 4 are interfering but due to the decreasing side slopes 72a and 72b of the power spectral density this is much less severe.

Below, four exemplary scenarios of interferences 28 caused by adjacent carriers or by carriers within the frequency range of the wanted carrier 18 will be discussed. For these four scenarios four different optimizations by adjusting the filter(s) 20 and 34, respectively, of the receiver 10 or 40 in order to suppress the interference will be illustrated by FIG. 4a to FIG. 4d.

Figure 4A:
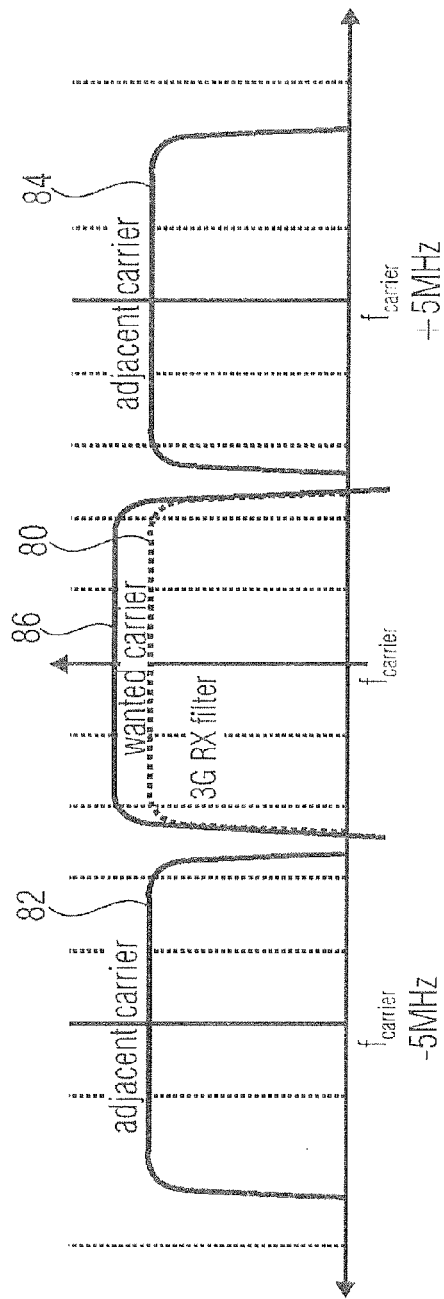
FIG. 4a schematically shows an interference scenario including three adjacent carriers and a passband characteristic according to an embodiment.

FIG. 4a schematically shows an interference scenario and a passband characteristic 86 of a RRC-filter, e.g. the filter 20 of a receiver 10 or 14, as a function of a relative frequency of a wanted carrier 80. The wanted carrier 80 has a center frequency $f_{carrier}$, a first adjacent carrier 82 has a carrier frequency $f_{carrier}$−5 MHz and a second adjacent carrier 84 has $f_{carrier}$+5 MHz. The passband characteristic 86 of a 3G receiver filter has the same frequency $f_{carrier}$ and the same bandwidth of the wanted carrier 80 to receive the communication signal 14.

The diagram shows a possible solution by changing the passband characteristic 86 of a filter 20 and overall filtering response, respectively, according to the estimation of a priori knowledge, if the frequency layout where each cell is spaced greater than or equal to 5 MHz. This interference scenario may be detected, for example, by the scanner 22 of the receiver 10 or by the analyzer 44 of the receiver 40. Hence, the controller 30 or 48 may perform the adjustment of the passband characteristic 32 to the passband characteristic 86 in order to receive the wanted carrier 80 interference-freely, in analogy to the wanted carrier 18 of FIG. 1. and FIG. 2.

Figure 4B:
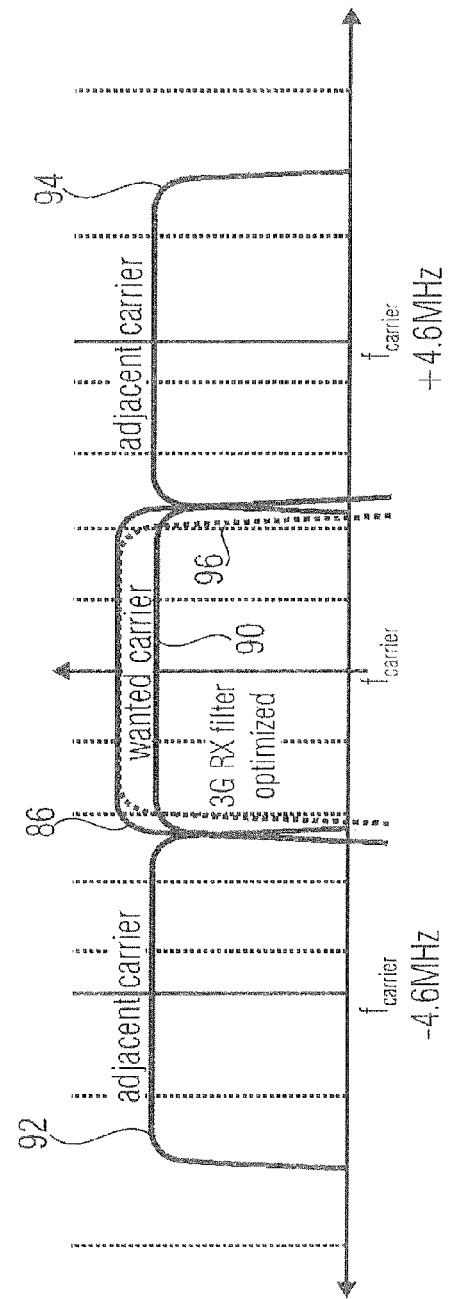
FIG. 4b schematically shows an interference scenario including three further adjacent carriers at reduced carrier spacing compared to the scenario of FIG. 4a and a passband characteristic adjusted according to an embodiment.

FIG. 4b schematically shows an interference scenario at reduced carrier spacing compared to the scenario of FIG. 4a and a passband characteristic 96 adjusted by narrowing filtering bandwidth. The diagram shows a wanted carrier 90 and two adjacent carriers 92 and 94. The wanted carrier 90 is $f_{carrier}$, the adjacent carrier 92 is $f_{carrier}$−4.6 MHz and the carrier 94 is $f_{carrier}$+4.6 MHz. Further, the passband characteristic 86 of an unadjusted filter and the passband characteristic 96 optimized by narrowing filtering bandwidth are illustrated. The two passband characteristic 86 and 96 have the frequency $f_{carrier}$ of the wanted carrier 90, but the bandwidth of the passband characteristic 96 is smaller than the bandwidth of the passband characteristic 86.

The background of this interference scenario is that various operators are facing the problem that their overall spectrum is limited and within their band locations they do not have to serve 3G cells, but also other radio-access-technologies (RATs) like for example 2G or LTE. In this case they are willing to decrease the UARFCN carrier spacing from 5 MHz to a lower number, for example 4.8 MHz or 4.6 MHz at the expense of a higher adjunct channel spectral leakage into the wanted band. Therefore, a reduced UARFCN carrier spacing can lead to serve adjacent spectral leakage which results in degraded link-level performance and bad user experience.

The passband characteristic 96 is the result of the enhancement to the receiver 10 or 40. The expression of the adjacent channel interference is enhanced by the adjusted filter 20 in order to show passband characteristic 96. In case of reduced carrier spacing the adjacent channels 92 and 94 interfere with the wanted carrier 90 from both sides (high and low side). In this case, the overall receiver filtering response 96 could be a narrower band compared to the non-adjustable RRC design. The possible solution is to optimize the passband characteristic 96 by reducing the receiver filter channel bandwidth symmetrically. This adjustment will significantly reduce the interference. Of course this will also result in reduced received signal energy and also in a non-ISI overall improved response which is not Raised Cosine anymore. However, the net effect together with the interference suppression will still improve overall link-level performance. The detailed shape of the overall receiver passband characteristic will depend on the level and the spacing of the interference of the wanted signal carrier 90.

As described the adjustment of the passband characteristic 32 to the passband characteristic 96 would be the possible solution for such an interference scenario. Here, for example, the scanner 22 of the receiver 10 or the analyzer 44 of the receiver 40 may detect the current interference situation and the controller 30 or 48 may perform the adjustment of the filter 20.

The interference 28 does not necessarily have to be symmetric in the sense that there are interference carriers above or below the wanted signal. It could also be from above or below frequencies only, as will be shown in FIG. 4c.

FIG. 4c schematically shows an interference scenario at reduced carrier spacing compared to the scenario of FIG. 4a and a passband characteristic 98 optimized by narrowing filtering bandwidth on one side (one-sided only). The diagram is plotted over the frequency of two adjacent carriers 90 and 94. The wanted carrier 90 has a frequency $f_{carrier}$, while the adjacent carrier 94 has a frequency $f_{carrier}$+4.6 MHz. Furthermore, the passband characteristic 86 of an unadjusted filter and the passband characteristic 98 of the adjusted filter 20 are illustrated, wherein both passband characteristics 86 and 98 have the same frequency $f_{carrier}$. The bandwidth 32 of the passband characteristic 98 is adjusted on a side of the adjacent carrier 94 so that the bandwidth of the passband characteristic 98 is smaller than the bandwidth of the passband characteristic 86 on the corresponding side.

If adjacent channel interference 28 from one side is detected by the scanner 22 or the analyzer 44, the passband characteristic 32 could be adjusted or narrowed from one side only such that the passband characteristic 98 may arise; meaning the one-sided interference 94 can be suppressed by reducing the filter bandwidth on one corresponding side. The adjustment of the filter 20 may be performed by the controller 30 or 48.

FIG. 4d schematically shows an interference scenario in which a spectrum of a carrier is disturbed by a spectrally narrow interferer 102 positioned within the broadband spectrum 100 and a passband characteristic optimized by an adjusted notch filter 34. The section of the broadband spectrum 100 is plotted over a relative frequency with a center frequency $f_{carrier}$, wherein the broadband spectrum 100 has a notch 104 at the frequency approximately −1.4 MHz. The broadband spectrum 100 extends on one side to approximately −2.34 MHz. The interferer 102 and 2G carrier 102, respectively, lies within the broadband spectrum 100, wherein the 2G carrier has a center frequency of approximately −1.4 MHz and a bandwidth of approximately 200 kHz.

In case of a significant 2G interference 102, which has a 200 kHz bandwidth only, different strategies could be applied depending on the frequency of the 2G interferer and the 2G carrier 102, respectively, relative to the broadband spectrum 100, e.g. a 3G broadband spectrum. A specific 200 kHz notch filter 34 can be applied on top of the passband characteristic 32 of the filter 20. Similar to the method of optimization shown in FIG. 4b or 4c, the notch filter 32 will result in a broadband spectrum 100 having a notch 104. In other words, the adaption or the applying of the notch filter 32 will result in a reduced wanted signal 100 and in distortion of the signal, but again the net effect will be a tradeoff for improved link-level performance.

This interference scenario may be detected, for example, by the scanner 22 of the receiver 10 or by the analyzer 44 of the receiver 40. Hence, the controller 36 or 50 may perform the adaption of the frequency 38 of the notch filter 32 with the result of notching-out the interferer 104 within the broadband spectrum 100 by the notch 104.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a Blu-Ray, a CO, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A mobile communication device receiver for receiving a communication signal of a base station via a carrier, the receiver comprising:
a first filter;
a scanner configured to scan a frequency range in order to determine a spectral distribution of interferences adjacent to the carrier and configured to discover a plurality of assigned channels within the frequency range based on the spectral distribution;

a first controller configured to adapt an initial passband characteristic of the first filter based on the spectral distribution in order to reduce interferences and provide control data to control a transmit power of the communication signal of the base station, the control data is based on a received signal quality of the communication signal;

a first receiving unit for receiving a first frequency band and a second receiving unit for receiving a second frequency band, wherein the scanner is part of the first receiving unit;

a notch filter connected to the first filter; and wherein the first controller is configured to further change the passband characteristic of the first filter according to alternative settings of the first filter and to intermittently try other passband characteristics of the first filter that lead to better quality of the communication signal based on the received signal quality of the communication signal and knowledge of the spectral distribution, and wherein the alternative settings are independent of the transmit power.

2. The receiver according to claim 1, wherein the receiver comprises a 2G receiver and a 3G receiver, wherein the scanner is part of the 2G receiver.

3. The receiver according to claim 1, wherein the scanner is configured to scan the frequency range by using a received signal strength indication.

4. The receiver according to claim 1, wherein the first controller is configured to adapt the passband characteristic of the first filter from a first side and/or from a second side of the passband characteristic.

5. The receiver of claim 1, wherein the alternative settings include widening the passband characteristic at one of a higher and lower frequency side.

6. The receiver of claim 1, wherein the alternative settings yield an improved measured error bit rate.

7. The receiver of claim 1, wherein the scanner is configured to discover the plurality of assigned channels by samples of the communication signal within the frequency range at a sample pitch of less than a spectral width of the carrier.

8. The receiver of claim 1, wherein the scanner is configured to measure a signal strength of the communication signal in narrow frequency portions to determine an exact interference scenario, wherein the narrow frequency portions are narrower than the frequency range.

9. The receiver of claim 1, wherein the alternative settings are selected from various settings that widen and narrow the passband characteristic at one or both of higher and lower frequency sides and wherein the controller is configured to measure the quality of the communication signal.

\* \* \* \* \*